May 31, 1960

L. A. M. PHELAN ET AL 2,938,648

PRESSURE COOKER

Filed Dec. 26, 1957

INVENTORS
LOUIS A. M. PHELAN
HAROLD V. KELTON
BY
James E. Nilles
ATTORNEY

INVENTORS
LOUIS A.M. PHELAN
HAROLD V. KELTON
BY James E. Nilles
ATTORNEY 2,938,648
Patented May 31, 1960

2,938,648

PRESSURE COOKER

Louis A. M. Phelan, Roscoe, and Harold V. Kelton, South Beloit, Ill.; said Kelton assignor to said Phelan Filed Dec. 26, 1957, Ser. No. 705,190

9 Claims. (Cl. 220—55.3)

This invention relates to high speed pressure cookers and finds particular utility in the large, stationary type of cooking apparatus.

In pressure cookers of the type to which this invention pertains, the pieces of food are immersed in a very hot cooking fat in the cooking vessel. A cover is then sealed and locked in position and a water injection system may be used to instantly develop superatmospheric pressure within the vessel. By this principle of deep fat under pressure, the food is cooked to higher standards of tenderness and flavor and in a fraction of the time required by conventional methods.

Cooking devices of this character are often very large, some being on the order of 16 inches in diameter. Cooking pressures of 35 p.s.i. are commonplace and it will therefore be apparent that a force of several thousands of pounds will be acting to lift the cover during the cooking period. As a result the cover must effectively seal against this pressure and be securely locked in position during operation. Furthermore, the cooker should be incapable of being opened until the pressure in the vessel has dropped to atmospheric to prevent any hot fat, which may be at 375 degrees F., from blowing out of the vessel.

Consequently, the covers used in cooking devices of this type are necessarily very heavy, large, and hot, and generally awkward to handle. At the same time, however, in establishments where these cookers find great utility, speed and efficiency of operation are essential, and the vessel must be opened and closed quickly and many times during the day. Therefore the operation of the cooker should be as effortless, safe and foolproof as possible.

In the co-pending U.S. application, Serial Number 605,872, filed August 23, 1956, now Patent No. 2,917,200, entitled, "Pressure Cooker," a cooking device of this general type is disclosed wherein a highly successful type of cover and mounting therefor is provided, which cover is positively moved vertically by a cam and lever in either vessel sealing or opening directions. When opened the cover is then swung horizontally out of the way without requiring the cover to be lifted by the operator.

With the advent of even larger cookers, however, certain space limitations have discouraged the above type of mounting for the cover. For example, it is desirable to maintain a counter depth of about 31 inches and a larger cover could not conveniently be swung to the side. In the past, a cover that swung open about a horizontal pivotal axis, however, has not proved successful for various reasons, such as, difficulty in providing a proper seal between the vessel and the swinging cover, and also the difficulty of the operator to easily open and close the cover. The latter problem was due to the fact that the operator had to reach a considerable distance over the hot counter to grasp the cover handle which made it difficult for him to apply the necessary pressure, particularly to close the cover against the resistance of the counter-balance spring, the pressure being developed within the vessel when the cover starts to close, and also the resistance offered by the compressing of the O-ring seal as the cover begins to close. The sum of these resistance forces was considerable and experience with such an arrangement indicated that other mechanical advantage devices would have been necessary to aid the operator in closing the cover.

In cooking apparatus of this type a non-toxic, non-aqueous cooking fat is used which is held at a temperature of up to about 375 degrees F., depending on the type of food being cooked. Many cooking operations are performed during the day in which a basket of food is immersed in this fat and, after a cooking period of a few minutes, is withdrawn from the fat. As this fat is used, it becomes progressively more foamy in nature. In other words, as the fat gets older it bubbles and foams to such an extent that it must be discarded and replaced with new, clean fat. The location of the exhaust port for such a cooker is therefore important because when the fat reaches such a condition that it rises in the vessel to level of the exhaust conduit, it will be lost when it passes through the conduit and requires replacement. Furthermore, the fat will plug the conduit to prevent proper pressure release therethrough.

The general pressure exhaust means for this type of cooker is shown and described in the co-pending U.S. application, Serial Number 705,170, filed December 26, 1957, and reference may be had thereto, if deemed necessary or desirable, for a more complete understanding thereof. However, it is believed sufficient to say that the exhaust means permits the greasy steam to be discharged from the vessel and when the pressure therein reaches a predetermined minimum the cover is unlocked and may be opened. It is important, therefore, that the cooking fat does not reach this exhaust outlet and when it does, it must be replaced with new cooking fat.

In accordance with the present invention, a pressure cooker has been provided in which the cover may easily be swung about a horizontal pivot and forced downwardly into a fully closed position where locking means can then secure it in place. The arrangement is such that the operator can easily open and, more particularly, return the cover to the sealing position, regardless of its size and weight and without the necessity of a mechanical advantage device, other than a counter balance spring which aids in the opening of the cover.

The invention also provides a pressure cooker having an O-ring type of seal between the internal diameter of the vessel and a cover which swings about a horizontal axis and down into the vessel in a sealing position. The relative shape of and clearances between the parts, and the location of the pivot axis relative to the sealing position of the O-ring, enable the use of the desirable O-ring type of seal in such a swinging cover.

The invention further contemplates a safety device by which the cover of a pressure cooker is prevented from complete and immediate opening in the event any appreciable pressure remains in the vessel. More specifically, initial movement of a swinging bail, which is detachably connected between the cover and cooker frame, permits only limited opening of the cover whereby any remaining pressure is released before further opening of the cover can take place.

Another and important aspect of the present invention is the location of the pressure exhaust opening in the cover of a pressure cooker, which results in the ability to use the cooking fat for a longer period of time before it needs replacing.

The invention also provides a novel means for conducting the exhaust from the cover of a pressure cooker, which cover pivots about a horizontal axis. More particularly, a sealed swivel joint is provided between the swingable cover and a fixed exhaust pipe—the exhaust passing through a conduit which is co-axial with the shaft which forms the pivotal axis for the cover.

These and other objects and advantages will appear hereinafter as this disclosure progresses, reference being had to the accompanying drawings in which.

Figure 1:
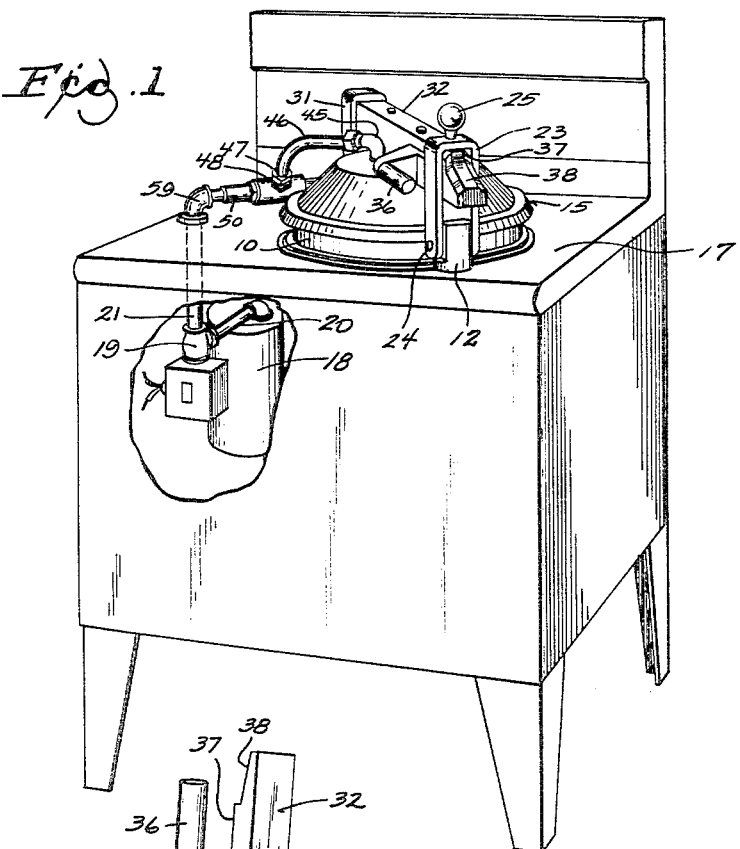
Figure 1 is a perspective view of a pressure cooker embodying the present invention, certain parts being in section and broken away for clarity.

Referring in greater detail to the drawings, the vessel 10 is mounted in the cooker frame which comprises the side column members 11, 12 connected together at their lower ends by cross braces 13. The vessel is supported on the braces 13 and is also accurately positioned between the columns 11, 12 by the support ring 14 through which it extends. The support ring is also rigidly secured to the columns and serves to insure roundness of the upper end of the vessel in order that the cover 15, and more particularly its associated O-ring 16, will seal properly within the vessel.

The upper end of the vessel protrudes above the top counter surface 17 as do the upper ends of the columns 11 and 12.

A discharge tank 18 is located within the cabinet and is open to atmospheric pressure. An electric motor operated exhaust and pop-off valve 19 is also located within the cabinet and has an outlet conduit 20 which discharges into the tank. The valve has an inlet conduit 21 which receives exhaust steam and pressure from the vessel as will appear hereinafter. If a more complete description of the structure or operation of the motor operated valve is desired, reference may be had to the said co-pending U.S. application, Serial Number 705,170, now Patent No. 2,917,200, issued December 15, 1959.

A swingable locking member in the form of a bail 23 is pivotally attached to the upper end of column 12 by means of the pin 24 extending therethrough. A handle 25, preferably of heat insulating qualities, is secured to the bail for swinging the latter between the fully open position shown in Figure 2 and the fully locked position shown in Figure 1. It will be noted the bail is located adjacent the front side of the counter top.

The upper end of the other column 11 has an aperture through which extends a shaft 27 rigidly held captive therein by set screw 28. Shaft 27 has a slot 29 in each of its ends in which is seated one end of the counterbalance springs 30 that surround the shaft. The other ends of the springs are turned axially of the shaft and bear against the bail 31 which is pivotally mounted on the shaft 27 extending therethrough. A yoke bar 32 is rigidly secured by bolts 33, 34 to the bail 31 and the cast cover 15 is rigidly secured to the bar 32 by bolts 35. Thus the springs 30 urge the cover assembly upwardly about the pivot shaft 27 to the open position shown in Figure 2.

Figure 2:
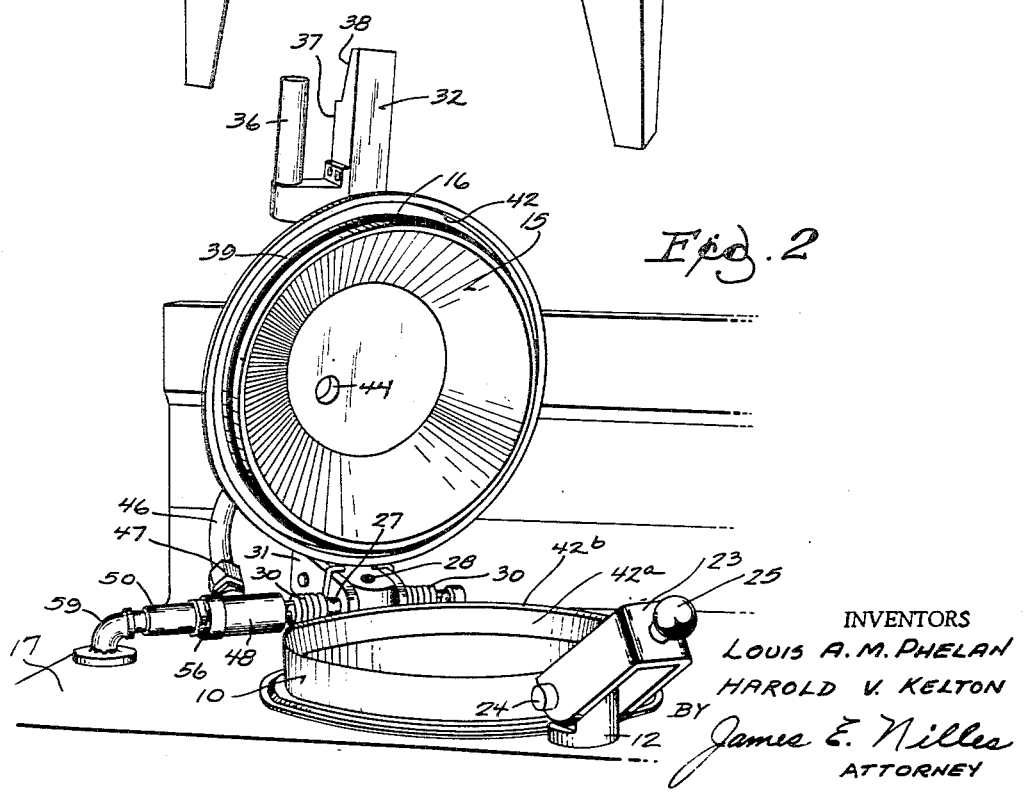
Figure 2 is a fragmentary enlarged, perspective view of the upper portion of the cooker shown in Figure 1, and showing the cover in the fully open position.
Figure 3:
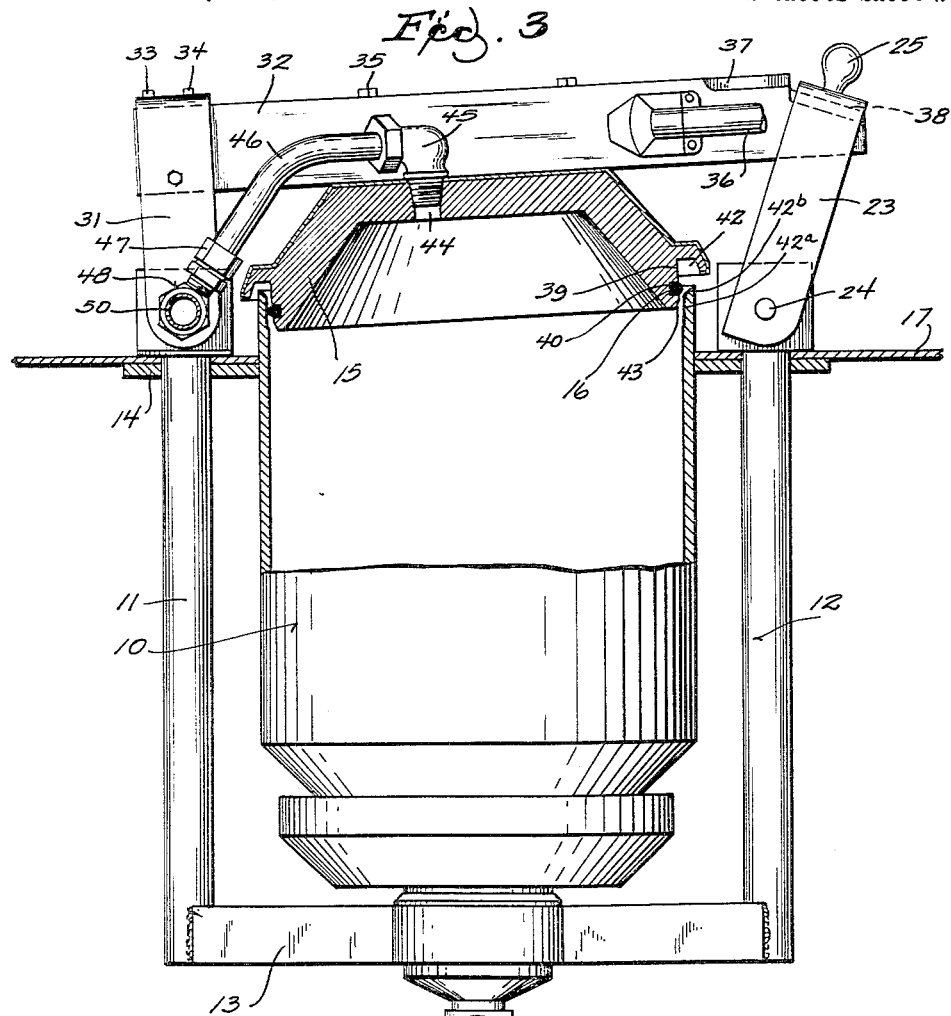
Figure 3 is a side elevational view, in section, of the cooker and showing the cover in the initial pressure releasing position.
Figure 4:
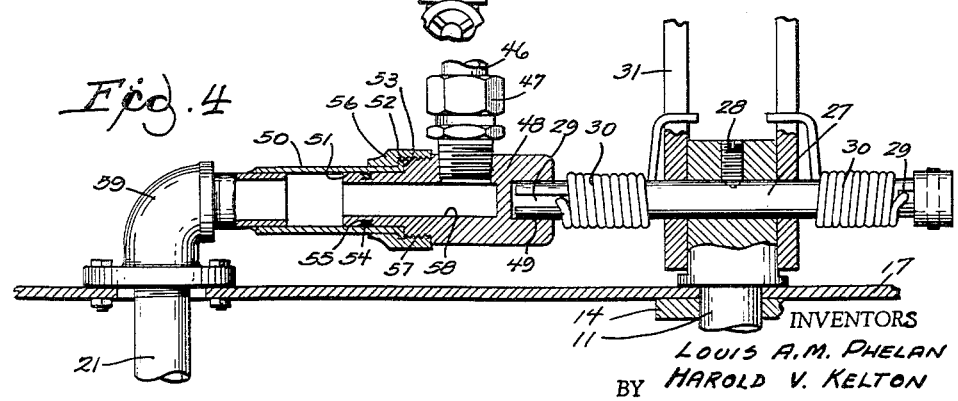
Figure 4 is an enlarged cross sectional view taken through the pivot axis of the cover and showing the exhaust passage therethrough.

The cover assembly includes a handle 36 which is grasped by the operator to open or close the cover. The yoke has a locking portion 37 over which the bail 23 is adapted to slip when the cover is in the fully closed position as shown in Figure 1. When pressure is in the vessel, the yoke bar 32 is forced upwardly tightly against the bail which prevents the cover from opening. The yoke bar also has an inclined portion 38 at its free end over which the bail is also adapted to slip in the initial pressure releasing position, as shown in Figure 3, the exact function of which will be referred to later.

The cover has a cylindrical portion 39 containing an O-ring seating groove 40 therearound. A large O-ring 16 is seated in the groove and has a considerable portion extending beyond the periphery of cylindrical portions 39 of the cover. The lowermost end of the cover terminates in a beveled portion 43 of considerable angle. The cover has a downwardly directed annular channel 42 which slips over the upper edge of the vessel when the cover is closed. It will be noted that the length of the cover cylindrical portion 39 is relatively short as compared to the diameter of the cover and this feature contributes to the possibility of using an O-ring type seal in a swinging cover that extends into a vessel. The upper internal surface of the vessel is formed as a cylindrical surface 42a which forms a very accurate sealing surface for the O-ring. The uppermost end of the cylindrical surface 42a terminates in a taper or chamfer 42b.

The pivot axis 27 lies on approximately the same horizontal plane as does the O-ring in the sealing position. With the above described relationship between the cover and vessel, the cover can be swung about a horizontal pivot, without any binding between the cover and vessel and at the same time an efficient seal is provided therebetween. The O-ring extends farther outwardly past the peripheral portion of the cover than in conventional O-ring seal designs, which also contributes to the feasibility of this type seal as used with a swinging cover that extends into the vessel.

If there is any appreciable pressure in the vessel, the operator will be unable to pull the bail 23 off of the yoke bar. Even a few pounds per square inch pressure in the vessel, acting on the large area of the cover, will be sufficient to hold it tightly against the bail and prevent the latter from being pulled off the bar. If, however, the operator accidentally knocked the bail off locking portion 37 of the bar, the bar would fly upwardly and its inclined portion 38 would then engage the bail to prevent the cover from being thrown open. In this respect it should be noted that the inclined surface 38 is flat but is formed generally on an arc with the pivot point of the bail as a center. Thus the bail seats firmly on surface 38 and will not slip off when the cover is urged upwardly. This initial pressure releasing position is shown in Figure 3. Any fat and steam blast escaping when the cover is in this position would be first directed into the downwardly facing channel 42 and thereby prevented from injuring the operator. After the remaining pressure has thus been completely released, the bail may be swung free of the yoke bar and the cover then raised.

The means for conducting the exhaust pressure from the vessel will now be described which includes the location of the exhaust port 44 in the top of the cover.

An elbow 45 is threaded into the cover and has a curved conduit 46 rigidly connected thereto. The other end of conduit 46 has a fitting 47 which is threadably engaged in the swivel body 48. The body 48 has a bore 49 in its one end by which it is rotatably mounted on the end of shaft 27. Thus as the cover swings, the conduit and swivel body swing with it as a unit.

A stationary sleeve 50 is slipped over a reduced diametrical portion 51 of the rotatable body and has a radially extending flange 52 which abuts against a shoulder 53 of the body. An O-ring 54 is seated in an annular groove 55 in the body and seals between the sleeve and body regardless of any rotation therebetween. A hex collar 56 is threadably engaged on the body as at 57 and the inner end of the collar abuts against the body and leaves the sleeve flange 52 free to rotate. The collar 56 may then rotate with the body as the cover is swung. The bore 58 of the body places the conduit in communication with the sleeve which in turn has an elbow 59 threaded at its other end. The elbow is secured to the valve 19 by conduit 21.

In this manner a discharge passageway is provided between the swingable cover and the stationary part of the discharge line, the stationary conduit being located co-axially with the pivot axis for the cover. The passageway remains connected regardless of the position of the cover and is always ready for use.

By exhausting through the cover in this manner, much longer fat life has been possible, which contributes to a more economical operation.

Another important aspect of the invention is the fact that the yoke is located angularly with respect to the cabinet and the handle 36 is adjacent the front of the counter. The cover swings about an axis which is disposed angularly to the counter front. With this particular disposition of the cover pivot axis, the operator can apply more pressure in closing the cover, than he otherwise could if the cover pivot axis was parallel to the counter front or normal thereto. Stated otherwise, his body relationship to the swinging yoke is such that he can get better leverage on the handle to force the cover into the vessel against the action of the counterbalance springs, the pressure that begins to develop in the vessel as the cover is even partially closed, and the pressure required to compress the large diameter O-ring. In fact, experience has indicated that a mechanical assist would be necessary in order for many operators to fully close the large cover, if the present angularly disposed axis were not used.

Various modes of carrying out the invention are contemplated as being within the scope of the following claims particularly pointing out and distinctly claiming the subject matter which is regarded as the invention.

We claim:

1. In a pressure cooker having an open top vessel, said vessel having an internal cylindrical sealing surface adjacent its upper end, a cover assembly for said vessel pivotally mounted on a fixed horizontal axis adjacent one side of said vessel for swinging between open and vessel sealing positions, said cover assembly having an O-ring seal around its periphery which is sealingly engageable with said cylindrical surface when in said sealing position, said assembly including a bar having a locking surface and an initial pressure releasing surface, and a swingable locking member pivotally mounted on the other side of said vessel and engageable with said locking surface when said assembly is in said sealing position and engageable with said initial pressure releasing surface when said assembly is in a partially open position to prevent further opening thereof, said member completely disengageable from said assembly whereby the latter may be swung to a fully open position.

2. In a pressure cooker having an open top vessel, a cover assembly including a yoke bar pivotally mounted on a horizontal and fixed axis adjacent one side of said vessel for swinging between open and vessel sealing positions, said bar having a locking surface and an inclined initial pressure releasing surface, and a swingable locking bail pivotally mounted on the other side of said vessel and adapted to slip over said bar and engage said locking surface when said assembly is in said sealing position, said bail also engageable with said inclined surface when said assembly is in a partially open position so as to prevent further opening thereof, said bail completely disengageable from said bar whereby the latter may be swung to a fully open position.

3. In a pressure cooker having an open top cylindrical vessel, a cover assembly for said vessel pivotally mounted on a horizontal axis adjacent one side of said vessel for swinging between open and vessel sealing positions, said assembly including a bar having a locking surface and an inclined surface, said assembly also including a cover having an annular downwardly facing channel adapted to fit over said cylindrical vessel, and a swingable locking member pivotally mounted on the other side of said vessel and engageable with said locking surface when said assembly is in said sealing position and engageable with said inclined surface when said assembly is in a partially open position to prevent further opening thereof, said channel disposed above and closely adjacent said vessel when said member is on said inclined surface to thereby direct any escaping pressure blast in a downward direction, said member completely disengageable from said assembly whereby the latter may be swung to a fully open position.

4. In a pressure cooker having an open top cylindrical vessel, a cover assembly including a yoke bar pivotally mounted on a horizontal axis adjacent one side of said vessel for swinging between open and vessel sealing positions, said bar having a locking surface and an inclined initial pressure releasing surface, said assembly also including a cover having an annular downwardly facing channel adapted to fit over said cylindrical vessel, and a swingable locking bail pivotally mounted on the other side of said vessel and adapted to slip over said bar and engage said locking surface when said assembly is in said sealing position, said bail also engageable with said inclined surface when said assembly is in a partially open position to prevent further opening thereof, said channel disposed above and closely adjacent said vessel when said bail is on said inclined surface to thereby direct any escaping pressure blast in a downward direction, said bail completely disengageable from said bar whereby the latter may be swung to a fully open position.

5. In a pressure cooker having an open top cylindrical vessel, said vessel having an internal cylindrical sealing surface adjacent its upper end, a cover pivotally mounted on a generally horizontal and fixed axis at one side of said vessel and swingable between an upright open position and a vessel sealing position, said cover having a cylindrical portion, and an O-ring seal seated in said cylindrical portion and extending beyond the periphery of said portion and adapted to seal against said vessel sealing surface when said cover is in said sealing position.

6. In a pressure cooker having an open top cylindrical vessel, said vessel having an internal cylindrical sealing surface adjacent its upper end, a cover pivotally mounted on a generally horizontal axis at one side of said vessel and swingable between an upright open position and a vessel sealing position, said cover having an axially short cylindrical portion, and an O-ring seal seated in said cylindrical portion and extending beyond the periphery of said portion and adapted to seal against said vessel sealing surface when said cover is in said sealing position, said axis located in substantially the same horizontal plane as said O-ring occupies in said sealing position.

7. In a pressure cooker having an open top cylindrical vessel, said vessel having adjacent its upper end an internal cylindrical sealing surface which terminates at its upper end in a taper, a cover pivotally mounted on a generally horizontal axis at one side of said vessel and swingable between an upright open position and a vessel sealing position, said cover having an axially short cylindrical portion and terminating at its lower end in a beveled edge, and an O-ring seal seated in said cylindrical portion and extending beyond the periphery of said portion and adapted to seal against said vessel sealing surface when said cover is in said sealing position, said axis located in substantially the same horizontal plane as said O-ring is located when in the sealing position.

8. In a pressure cooker mounted in a counter top having a front edge, said cooker comprising a vessel set into said counter top and extending a distance thereabove, said vessel having an internal cylindrical sealing surface, and a cover assembly having O-ring sealing means around its periphery and also including a yoke bar pivotally mounted at its end remote from said front edge on a generally horizontal and fixed axis at one side of said vessel for swinging between an upright open position and a lower vessel sealing position in which said sealing means engages said sealing surface, said axis positioned at an angle to said front edge whereby the other end of said yoke is adjacent said front edge when said assembly is in said sealing position.

9. In a pressure cooker mounted in a counter top having a front edge, said cooker comprising a vessel set into said counter top and extending a distance thereabove, a cover assembly including a yoke bar pivotally mounted at its end remote from said front edge on a generally horizontal and fixed axis at one side of said vessel for swinging between an upright open position and a lower vessel sealing position, said assembly also having a cover with an O-ring seal adapted to enter said vessel and be compressed for sealing engagement therewith, and counter-balance springs acting on said assembly urging it to said open position, said axis positioned at an angle to said front edge whereby the other end of said yoke may be pulled downwardly to a location adjacent said front edge to facilitate forcing said assembly into said sealing position.

References Cited in the file of this patent

UNITED STATES PATENTS

| | | |
|---|---|---|
| 1,230,316 | Napier | June 19, 1917 |
| 1,266,926 | Dundon | May 21, 1918 |
| 1,359,875 | Da Costa | Nov. 23, 1920 |
| 2,210,294 | James | Aug. 6, 1940 |
| 2,423,069 | McElhose | June 24, 1947 |
| 2,529,329 | De Frees | Nov. 7, 1950 |
| 2,534,164 | Finch | Dec. 12, 1950 |
| 2,552,053 | Miller | May 8, 1951 |
| 2,596,353 | Zollinger | May 13, 1952 |